United States Patent [19]

Hickey

[11] 3,994,843

[45] Nov. 30, 1976

[54] TEXTURED AND CAST POLYMERIC COMPOSITION AND METHOD

[75] Inventor: Richard M. Hickey, Concord, Mass.

[73] Assignee: Environmental Enterprises, Inc., Berlin, Md.

[22] Filed: Nov. 14, 1974

[21] Appl. No.: 523,930

Related U.S. Application Data

[62] Division of Ser. No. 203,426, Nov. 30, 1971, Pat. No. 3,862,074.

[52] U.S. Cl. .............. 260/17.4 CL; 260/29.6 NR; 260/42.55; 260/859 R
[51] Int. Cl.² .......................................... C08L 1/00
[58] Field of Search .............. 260/17.4 CL, 42.55, 260/29.6 NR

[56] References Cited

UNITED STATES PATENTS

| 3,360,494 | 12/1967 | Bolinger | 260/29.5 NR |
| 3,491,051 | 1/1970 | Elkin et al. | 260/29.6 NR |
| 3,639,157 | 2/1972 | Wonder | 260/29.6 NR |
| 3,646,178 | 2/1972 | Traübel et al. | 264/41 |
| 3,684,758 | 8/1972 | Honig et al. | 260/29.6 NR |
| 3,684,759 | 8/1972 | Reiff et al. | 260/29.6 NR |
| 3,705,164 | 12/1972 | Honig et al. | 260/29.6 NR |

OTHER PUBLICATIONS

Chem. Absts. 78:17803x, "Compositions for Producing an Antique Finish", Sormani.
Chem. Absts. 76:142637f, "Molded Articles based on Cellulosic Fibers", General Foam Products Ltd.
Chem. Absts. 79:43298b, "Contact Adhesive", Shakhnazaryan.

Primary Examiner—Edward M. Woodberry
Attorney, Agent, or Firm—Strauch, Nolan, Neale, Nies & Kurz

[57] ABSTRACT

Coating and structural component compositions which are aqueous dispersions of urethane and acrylic polymers and filler or binder additives which are applied as textured coating or formed as by casting in structural components like block, bars, etc., which include binders and fillers, and a method of casting and drying the composition to make the structural components.

17 Claims, No Drawings

TEXTURED AND CAST POLYMERIC COMPOSITION AND METHOD

CROSS REFERENCE TO RELATED APPLICATION

This application is a division of application Ser. No. 203,426, filed Nov. 30, 1971 and now U.S. Pat. No. 3,862,074, and entitled POLYMERIC COMPOSITION.

This invention relates to polymeric compositions and, in one aspect, relates more specifically to novel aqueous acrylicurethane dispersions usable for a variety of purposes.

As this suggests, my novel compositions are basically aqueous emulsions or dispersions of one or more acrylic polymers and one or more urethane polymers although they will also typically include at least a freeze/thaw stabilizer and a thickener. My novel compositions have a solids content of at least about 35 percent; and, for applications involving drying[1] at room temperatures, the urethane resin is kept in the range of from about 3 to about 80–90 percent by weight of the acrylic polymer. Compositions employing a somewhat higher proportion of urethane can be cured at elevated temperatures.

[1] The term "dry" will be utilized herein to identify that which occurs as water evolves from the novel compositions I have invented. This term has found universal acceptance although it is not suggestive of the complex changes which occur as water is removed from aqueous dispersions of synthetic polymers such as those I employ.

As a coating, the formulations I have invented dry in a period of 15–30 minutes to a smooth, transparent, resilient film having a number of highly desirable characteristics including outstanding durability, high tensile and tear strength, and excellent resistance to abrasion, scuffing, moisture, chemical attack, and to yellowing and other discoloration. The coatings are washable and adhere tightly to the substrates to which they are applied without creep or shrinkage, due at least in part to the absence of plasticizers.

Another advantage of the compositions described herein is that they have a low viscosity in combination with a high solids content. This makes the compositions easy to apply and also to compound with thickeners, pigments, fillers, and other additives. Further, my novel coating compositions can be employed even on difficult to cover substrates such as concrete or those of asphaltic material which tend to be softened by and bleed through the usual solvent-based coating materials.

As will become apparent hereinafter, the basic compositions just described may be modified by the incorporation of a variety of additives to produce films or coatings of widely differing appearance and application which, nevertheless, retain the advantages discussed above. Among the many types of coating compositions which may be produced by appropriate modification of the basic formulations are deep base and tinted coatings of flat to medium-high gloss, primers for metal and other materials, fire retardant and textured coatings, interior/exterior type coatings, wood finishes and stains, and coatings for aircraft and other vehicles.

The compositions of the present invention are also extremely useful adhesive binders. They can be compounded with appropriate fillers to produce structural components such as bricks and blocks and for a variety of other purposes calling for a binder.

The acrylic polymer component of my novel coating systems may be varied as desired for various applications of the invention, the limiting factor being that the acrylic be one which is water emulsifiable. One type of acrylic polymer which has been found useful is that described in U.S. Pat. No. 2,881,155 issued Apr. 7, 1959, to E. M. Hankins for POLYMERS OF SUBSTITUTED HETEROCYCLIC UREA COMPOUNDS, which is hereby incorporated by reference. The Hankins compounds are addition polymers of monomers having the formula

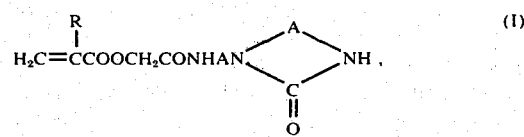

where R is hydrogen or methyl and A is an alkylene group having two or three carbon atoms. The compounds of formula I may be homopolymerized or copolymerized, typically with monoethylenically unsaturated compounds.

One aqueous emulsion of an acrylic polymer disclosed in the Hankins patent which has been found particularly suitable for the purposes of my invention is Rohm & Haas' Rhoplex AC-61 acrylic emulsion. This is a milky white liquid having the following physical properties:

| | |
|---|---|
| Solids content | 46–47% |
| pH | 9.5–10.0 |
| Weight per gallon | 8.9 lbs. |
| Specific gravity of solids | 1.13 |

A wide variety of polyurethanes can also be employed in the practice of the present invention depending upon the particular application at hand. In the case of the polyurethane, the limiting factors appear to be that the polyurethane have reactive hydroxyl groups and that it be dispersable in aqueous media.

It is believed in this regard that the improved abrasion resistance, appearance, and other superior properties of my novel compositions are at least in part due to the formation of intermolecular linkages between the urethane and acrylic components thereof. While the presence of this linkage has not been confirmed and its precise nature is only speculative, other investigators have led me to believe that it does exist and that it may be in the nature of an oxonium bond (see U.S. Pat. No. 3,360,494 issued Dec. 26, 1967, to Bolinger for COATING COMPOSITIONS OF UNSATURATED MONOCARBOXYLIC ACID POLYMER AND POLYURETHANE) but modified by the presence of surfactants to form a bond stronger than that attributable to an oxonium bond per se. In any event, whether or not the foregoing theory is correct, urethanes of the character identified above have proven to be the ones useful in the present invention.

A number of urethanes having the requisite characteristics are available from commercial sources and described in the patent literature. For examples, suitable urethanes are described with varying degrees of specificity in U.S. Pats. Nos. 3,148,173 issued Sept. 8, 1964, to Axelrod for POLYURETHANE-UREAS CONTAINING UREA-LINKED N-(2-HYDROXYPROPYL) ALKYLENE DIAMINES; 3,294,724 issued Dec. 27, 1966, to Axelrod for FILM-FORMING URE- THANE LATICES, AND PREPARATION BY CHAIN EXTENDING A PREPOLYMER OF AN ORGANIC DIISOCYANATE AND A POLYMERIC DIOL WITH A PIPERAZINE COMPOUND; 3,401,133 issued Sept. 10, 1968 to Grace for FILM-FORMING POLYURETHANE LATICES; 3,410,817 issued Nov. 12, 1968, to McClellan for POLYURETHANE LATICES; and 3,437,624 issued Apr. 8, 1969, to Dawn for AQUEOUS DISPERSIONS OF POLYURETHANE POLYMERS.

Specific examples of urethanes which are satisfactory for use in my invention are Wyandotte Chemicals Corporation nonionic latices X-1033 and X-1042. Both are water dispersions of completely reacted, high molecular weight urethane polymers having the following typical properties:

|  | X-1033 | X-1042 |
|---|---|---|
| Solids (% by weight) | 50 ± 2 | 50 ± 2 |
| Specific gravity | 1.05 | 1.05 |
| Viscosity (cps at 77° F.) | 200 | 150 |
| Surface tension (dynes per cm) | 50 | 55 |
| Mechanical stability (per ASTM Test No. D-1076-59) | >1200 | >1200 |
| Temperature stability (based on temperature cycling with agitation between 35–110° F.) | Excellent | Excellent |
| pH | 6.5–8 | 7–8.5 |
| Toulene (% by weight) | maximum of 4% | maximum of 4% |

More specifically, X-1033 is a nonionic urethane polymer prepared by reacting together an organic diamine and an isocyanateterminated polyurethane prepolymer formed for a polyalkylene ether polyol and an organic polyisocyanate, according to Dawn et. al., supra. For X-1033, the organic diamine is 2-methylpiperazine, the polyalkylene ether polyol is polyoxypropylene polyol and the organic polyisocyanate is toluene diisocyanate.

I may employ mixtures of urethanes in the formulation of my novel compositions as suggested above. For example, X-1042 produces a coating with greater hardness and adhesion than X-1033 but tends to produce a cloudy rather than transparent film in unpigmented formulations. However, transparency can be maintained and increased hardness and adhesion still obtained by combining X-1042 with the X-1033 latex. As little as 10 percent of the X-1042 latex will produce a significant increase in hardness and adhesion; up to 90 percent of the urethane can be X-1042 depending upon the application of the system.

In conjunction with the foregoing discussion of my novel compositions, I wish to call attention to U.S. Pat. No. 3,360,494, cited above, and to U.S. Pat. No. 3,491,051 issued Jan. 20, 1971, to Elkin for FABRIC TREATING COMPOSITIONS. Both patents are concerned with compositions for treating fabrics. While there is some resemblance between the compositions disclosed in the foregoing patents and those I have invented, The resemblance is entirely superficial; the patented compositions would not be at all satisfactory for my purposes.

For example, Elkin is concerned with the use of polyacrylic acid salts as emulsifiers, the goal being primarily aqueous systems of "very low solids content". Such solutions would not be useful for coating purposes. And, if a higher solids content is employed in the Elkin formulations, elevated temperatures are required to cure the composition. This again makes the Elkin compositions unusable for many of my applications.

The Bolinger compositions are unsatisfactory for my purposes for much the same reasons as those patented by Elkin. The solids content is too low, and curing requires elevated temperatures. Furthermore, the ratio of urethane to monocarboxylic acid polymer is too high to make the compositions usable in applications such as those described above.

As discussed above, my invention consists in one aspect in the provision of certain novel coating and binder compositions possessing unique and desirable characteristics. In another aspect my invention relates to multi-layer coatings or coverings for floors and other substrates. In a typical application of this character the substrate is covered with a clear coating of the type described above; and a pigmented coat of the same type of material is then applied. While the pigmented coat is still tacky, decorative flakes or chips may be scattered on it. The coating is then dried and the excess particles removed. This is followed by a coat of my novel clear coating material to lock the decorative particles in place, and up to four additional clear glaze or top coats to increase the resilience and durability of and otherwise improve the performance and/or appearance of the coating system.

Methods of producing coatings superficially resembling that method just described are disclosed in U.S. Pats. Nos. 3,577,257 issued May 4, 1971, to Hutzler for METHOD FOR FORMING DECORATIVE POLYURETHANE COATINGS; 3,549,404 issued Dec. 22, 1970, to Liberti for SEAMLESS MULTI-LAYERED COATING ASSEMBLY AND PROCESS FOR PREPARING SAME; and 3,446,664 issued May 27, 1969, to Murphy for METHOD OF PRODUCING A DECORATIVE COATING ON A SURFACE.

One major difference between my novel method and that disclosed by Hutzler is that my coating compositions are aqueous emulsions while those employed by Hutzler are solvent based. My novel compositions consequently have a number of advantages: much shorter drying times, longer pot life, no yellowing, and greater versatility. Additionally, solvent-based polyurethane coatings are tedious to apply, create a considerable fire hazard, lack recoatability, and are apt to shrink and creep as they cure. My novel coating compositions have none of these disadvantages.

Furthermore, the solvents in coating compositions of the type disclosed in Hutzler are highly toxic; copious ventilation must accordingly be provided when they are employed. And gloves and other protective gear must be worn as these solvents can also cause dermatitis. Also, the solvents in question attack certain substrates such as those of the asphaltum type as well as decorative fillers which they may contact.

In addition, the coating systems disclosed in the Hutzler patent are much softer than those I have invented. They are accordingly inferior in qualities such as wear and scuff resistance, etc.

At first blush it would appear that the coating systems disclosed by Liberti would be free from the disadvantages just discussed as the initial layers of these systems are aqueous vinyl acetate/urethane formulations. This, however, is illusory; the top coat or coats of these systems are solvent-based urethanes. Thus, for all practical purposes, the Liberti systems have the same disadvantages as those patented by Elkin.

The Murphy patent is even less relevant than Hutzler or Liberti. Murphy's method employs solvent-based urethanes which have the disadvantages just discussed and other coating materials such as lacquers and shellacs, which are far inferior to my novel coating compositions.

From the foregoing it will be apparent that one important and primary object of my invention resides in the provision of novel, improved coating and binder compositions which are useful in a variety of applications.

Another important and primary object of the present invention is the provision of novel, improved compositions of the type identified in the preceding paragraph which are aqueous dispersions or emulsions of at least one acrylic polymer and at least one urethane polymer.

Another important but more specific object of the invention resides in the provision of compositions in accord with the present invention which are curable at room temperatures to smooth and textured, durable, resilient films which have high tensile and tear strength; which possess excellent resistance to scuffing, abrasion, moisture, chemical attack, and yellowing and other discoloration; which are washable; and which will adhere tightly to the substrate on which they are formed without shrinkage or creepage.

Yet another important object of the invention resides in the provision of novel, improved multi-layer coating systems of superior quality which employ coating compositions in accord with the preceding objects.

A still further important object of the invention resides in the provision of novel structural or building components in which the compositions described herein are employed as binders.

Other important objects of the present invention as well as additional features and advantages thereof will become apparent from the appended claims and as the ensuing detailed description and discussion proceeds in conjunction with the following examples which are intended only to illustrate and not to limit the scope of the invention.

As indicated above, what may be considered the basic compositions of the invention are those formulations which dry to a colorless, transparent film. These compositions can be used as binders, sealers, primers, and glaze coats to lock decorative particles in place in multi-layer coating systems as well as for other purposes. They can also be modified in a variety of ways to provide pigmented and textured coatings of varying character, fire retardant coatings, primers, fillers, etc.

The following example describes the formulation of a clear coating composition in accord with the principles of the present invention.

EXAMPLE I

Clear Coating Composition

One clear coating system in accord with the present invention is made by charging the following ingredients in the indicated order to a Morehouse-Cowles or Hockmeyer mill operating at low speed:

| Ingredient | Parts by Weight |
| --- | --- |
| Water | 208 |
| Aqueous Acrylic Emulsion (Rohm & Haas AC-61) | 564 |
| Aqueous Urethane Emulsion | 98 |

-continued

| Ingredient | Parts by Weight |
| --- | --- |
| (Wyandotte X-1033) | |

The speed is increased to medium after the mill has been charged with the foregoing and the ingredients blended for on the order of 20 minutes.

I next preferably add a freeze/thaw stabilizer to the aqueous acrylic-urethane dispersion. I may use one part by weight of ethylene glycol for this purpose; the mill will typically be operated at medium speed for 10 minutes after the ethylene glycol is added to insure uniform dispersion.

Next, I preferably charge a thickener such as hydroxyethylcellulose (2% solution, 0.5 parts by weight)[2] to the mill to control the viscosity of the blend and to keep the urethane and acrylic solids in suspension. The mill is typically operated at medium speed for 10 minutes after the addition of the thickener to insure its uniform dispersion.

[2]. Hydroxyethylcellulose is available from a number of sources including Union Carbide Corporation (Cellosize WP-4400) and Hercules, Inc. (Natrosol).

Finally, I preferably add a polyol such as hexylene glycol to the mill, typically in a proportion of 2 parts by weight. The polyol serves as an extender for the ethylene glycol; it also assists in adjusting the viscosity of the composition to the desired level. Mixing is typically continued for 10 minutes at medium speed after the polyol is added.

The resulting composition can be applied as a coating by brush or roller, by spraying, or by other conventional application techniques such as dipping, etc. Even at room temperature, the coating will dry quickly (15–30 minutes is typical) to a smooth, hard but flexible, transparent film having the desired characteristics identified above which easily exceeds the standards for glaze coatings set forth in Federal Specification TT-C-550a.

The properties of the clear formulations such as that just described can be varied to a considerable extent to make them the most useful for different applications of the invention. For example, the solids content of the formulation may be varied as may the type of acrylic and urethane polymer. Examples of such modifications are discussed above.

Also, the proportions of the ingredients in the formulation other than the urethane and acrylic polymers as well as the ingredients themselves can be altered to produce the desired properties in the coating. As an example, the proportion of thickener has been reduced to as low as 0.05 parts by weight in formulations as described above without the settling out of solids and without an unacceptable decrease in viscosity. Other adjuvants can be added to enhance various qualities as needed. These include nonionic surfactants which serve as dispersants in aqueous media such as Igepal CO 630 (GAF Corporation), Triton 100 and CF-10 (Rohm & Haas), and Tergitol NP 14 (Union Carbide) and anionic surfactants or wetting agents, which improve emulsifibility, coalescence, film stability, etc. Suitable anionic surfactants include Tamol 731 (Rohm & Haas), Daxad 30 (W. R. Grace Co.), and Nopcosant L (Diamond Shamrock Corporation).

Other additives which may be employed to impart additional properties are those which convert the clear formulation to one of the pigmented type. One representative pigmented composition is described in the example which follows:

EXAMPLE II

Flat Pigmented Coating

An exemplary pigmented coating composition in accord with the principles of the present invention of a flat or nonglossy character is made by charging a Hockmeyer or MorehouseCowles mill with the below-listed ingredients in the order shown under medium agitation:

| Ingredient | Parts by Weight |
| --- | --- |
| Water | 111 |
| Anionic surfactant (Tamol 731) | 10 |
| Nonionic surfactant (Triton CF 10) | 2 |
| Hydroxyethylcellulose (2% solution) | 50 |
| Defoamer (Colloid 667, Colloids, Inc.) | 1 |
| Hexylene glycol | 30 |
| Ethylene glycol | 15 |

The following are then added with medium agitation, also in the order listed:

| Ingredient | Parts by Weight |
| --- | --- |
| Titanium dioxide (e.g., Dupont Tipure TC) | 250 |
| Calcined clay (e.g., Huber 70C, J. M. Huber Co.) | 63 |
| Calcium carbonate[1] | 63 |
| Mica (e.g., Mica AAA, Thompson-Weinman & Co.) | 15 |

[1] Exemplary coating grade calcium carbonates are Camel White, H. T. Campbell & Sons Corp. No. 1 White and Atomite, Thompson-Weinman & Co.; Carbium, Diamond Shamrock; and Albacar 5930, Chas. Pfizer & Co.

The batch is ground at high speed for 20–25 minutes to a minimum of a 3-inch Heggman grind gauge. The speed is then reduced to low, the below-listed ingredients added in the indicated order, and agitation continued for on the order of 10 minutes:

| Ingredient | Parts by Weight |
| --- | --- |
| Acrylic emulsion (AC-61) | 198 |
| Urethane emulsion (X-1033) | 34 |
| Water | 73 |
| Hydroxyethylcellulose (2% solution) | 209 |
| Defoamer (Colloid 677) | 2 |

This coating composition dries at room temperature and has physical characteristics comparable to those of the clear coating compositions described above. Its properties can be varied as described in the preceding example, by altering the proof the titanium dioxide pigment and its extenders, in other ways described herein, and by employing yet other conventional constituents which will be readily apparent to those skilled in the relevant arts.

In conjunction with the foregoing, all or part of the titanium dioxide can be replaced with other pigments to produce pigmented coatings of colors other than white. Suitable pigments are available from a variety of sources including the Mineral Pigments Corporation. Depending upon the pigment employed, the extenders and/or the proportions of the ingredients may also be altered in accord with the manufacturer's recommendations or as desired to produce a particular effect in the ultimate coating.

As mentioned above, the novel coatings I have invented are particularly useful in multi-layered coverings for floors and other substrates. One such novel covering or system employing both a clear coating as in Example I and a pigmented coating as in Example II is described in the following example:

EXAMPLE III

A clear coating composition as described in Example I is diluted with water and applied to a floor to seal its surface. The sealer coat is allowed to dry (10 minutes is normally sufficient), and a coat of pigmented coating of selected color as described in Example II is applied. Decorative flakes or chips[3] are then scattered on the pigmented coat and the latter allowed to dry (this typically takes a maximum of 30 minutes).

[3] Such flakes and chips are available from numerous commercial sources.

When the coating is dry, the loose, excess chips are removed and the floor lightly sanded. A coat of a clear composition as described in Example I is applied to lock the chips in place and allowed to dry (this typically requires about 15 minutes). This coating is followed up with up to four glaze coats of the same clear coating with each coat being allowed to dry on the order of 15 minutes before the next coat is applied. The flooring system will support traffic without damage as soon as the last glaze coat dries, which may be only 2–3 hours after the application of the seal coat is first started.

The result is an exceptionally attractive floor having excellent durability as well as the other advantages discussed above in Example I.

Many variations may, of course, be made in the method just described, for example in the decorative filler. Or the filler may be eliminated if the effect it produces is not wanted. Another variation is the use of all clear coatings with or without a filler so that the substrate can be seen.

Further, it will be readily apparent that the novel coating technique just described can be used to coat substrates other than floors such as counter and table tops, wall panels, etc.

The following representative examples further illustrate the variety of coatings which can be made in accord with the present invention; they deal with other types of pigmented compositions employing its principles.

EXAMPLE IV

Medium-High Gloss Interior/Exterior Coating

To make a coating suitable for both interior and exterior use which will dry to a medium-high gloss, the following are premixed and charged into a Hockmeyer or Morehouse-Cowles mill:

| Ingredient | Parts by Weight |
| --- | --- |
| Propylene glycol | 30 |
| Ethylene glycol | 25 |
| Hydroxyethylcellulose | 2 |

Agitation is continued for 20–25 minutes; then the following ingredients are added to the mill in the indicated order:

| Ingredient | Parts by Weight |
| --- | --- |
| Anionic surfactant (Tamol 731) | 16 |
| Nonionic surfactant (Triton CF-10) | 1 |
| Defoamer (Colloid 677) | 1 |
| Water | 20 |
| Titanium dioxide | 253 |

The speed is reduced to low and the following added in order:

| Ingredient | Parts by Weight |
| --- | --- |
| Acrylic emulsion (AC-61) | 516 |
| Urethane emulsion (X-1033) | 91 |
| Premixture of: | |
| Tributyl phosphate | 19 |
| Phenyl mercuric acetate | 9 |
| (Carlisle Chemical Works, Inc. | |
| Avacide 60 or Avacide PMA 18% Hg) | |
| Defoamer (Colloid 677) | 2 |
| 28% Ammonium hydroxide | 2 |
| 2.5% solution of Hydroxyethylcellulose | 78 |

Agitation is continued until the mixture becomes homogeneous (typically on the order of 10 minutes).

The resulting compositions have the same characteristics and may be modified in much the same manner as the other compositions described herein.

EXAMPLE V

Commercial Type, Interior Grade, Pigmented Coating

The following ingredients are added in the order listed to a Hockmeyer or Morehouse-Cowles mill operated at medium speed:

| Ingredient | Parts by Weight |
| --- | --- |
| Water | 275 |
| Phenyl mercury acetate | 0.5 |
| Nonionic surfactant (Triton CF 10) | 3 |
| Potassium tripolyphosphate wetting agent (FMC Corp.) | 2 |
| Anionic surfactant (Tamol 731) | 2 |
| Lecithin[1] | 2 |
| Defoamer (Colloid 677) | 2 |

The following are then added to the mixture, also in the listed order:

| Ingredient | Parts by Weight |
| --- | --- |
| Titanium dioxide | 100 |
| Synthetic silica[2] | 35 |
| Calcined clay | 200 |
| Silica[2] | 90 |
| Calcium carbonate | 25 |
| Hydroxyethylcellulose | 1.5 |

[1]R&R 551, Ross & Rowe, Inc., or Kelecin 1081, Textron, Inc., for example.
[2]Johns-Manville Products Corp. Celite 266 and 281; Grefco, Inc. Dicalite L-5 and 395; National Lead Co. Lorite; Whittaker, Clark & Daniels No. 219 Crystalline and No. 21 Amorphous; Tamms Industries Gold Bond R and Silica Bond B; and Illinois Mineral Co. No. 1160 are examples of suitable silicas. Silica is a flatting agent and also provides enhanced wet abrasion resistance.

The speed of the mill is increased to high and the foregoing ground in the fluid vehicle, typically for 20–25 minutes. The speed is then reduced to low, the following ingredients added in the indicated order, and mixing continued for on the order of 10 minutes.

| Ingredient | Parts by Weight |
| --- | --- |
| Ethylene glycol | 15 |
| Coalescent (Texanol Tributylphosphate) | 5 |
| Hydroxyethylcellulose (2.5% solution) | 208 |
| Acrylic/Urethane emulsion (Example I) | 170 |
| Defoamer (Colloid 677) | 1 |

The resulting composition has a creamy consistency and good brushability. It dries at room temperature to a coating having the superior characteristics discussed above. This coating can be modified in a number of ways to adapt it for particular applications. Exemplary modifications are discussed elsewhere herein.

EXAMPLE VI

Semi-Gloss Tint Base

A Hockmeyer or Morehouse-Coweles mill is operated at medium speed, and the following are charged into it in the order listed:

| Ingredient | Parts by Weight |
| --- | --- |
| Water | 2 |
| Anionic surfactant (Tamol 731) | 9 |
| Propylene glycol | 60 |
| Defoamer (Colloid 677) | 0.5 |
| Phenyl mercuric acetate | 1 |

The speed of the mill is then reduced and the following pigment and extender added seriatim:

| Ingredient | Parts by Weight |
| --- | --- |
| Titanium dioxide | 225 |
| Calcium carbonate | 40 |

The pigments are ground at high speed for on the order of 20 minutes; the speed is then reduced to low and the following ingredients added in the order listed:

| Ingredient | Parts by Weight |
| --- | --- |
| Propylene glycol | 96 |
| Acrylic emulsion (AC-61) | 471 |
| Urethane emulsion (X-1033) | 55 |
| Premix | |
| Ammonium polyacrylic thickener (Acrysol G-110, Rohm & Haas) | 10 |
| Water | 67 |
| Butyl cellosolve coalescent (available, for example, from Commercial Solvents Co.) | 25 |
| Nonionic surfactant (Triton N-57) | 4 |
| Anionic surfactant (Triton X-207) | 4 |

This coating can be applied by conventional techniques like those described above in the preceding examples. It dries rapidly to a semi-gloss appearance, and it has the superior qualities of the other coatings described herein.

The foregoing formulation is only exemplary of the semigloss coating compositions of the present invention. A number of modifications which can be utilized to alter the characteristics of this type of coating composition are described above in Examples I and II and elsewhere herein.

A type of coating quite different from those described in the preceding examples is the intumescent or fire retardant coating. The following example illustrates how the principles of the present invention can be utilized to produce an intumescent coating:

EXAMPLE VII

Intumescent Coating Composition

The following ingredients are charged into a Hockmeyer or Morehouse-Cowles mill and premixed at low speed:

| Ingredient | Parts by Weight |
| --- | --- |
| Water | 239 |
| Potassium tripolyphosphate | 10 |
| Nonionic surfactant (Triton CF-10) | 4 |
| Ammonium phosphate | 260 |
| Blowing agent (Melamine) | 80 |
| Dipentaerythritol (Trojan Powder Co.) | 150 |
| Phenylmercuric acetate | 0.5 |
| Defoamer (Colloid 677) | 3 |
| Titanium dioxide | 60 |
| Chlorinated paraffin (Chlorowax 70, Diamond Shamrock) | 40 |

This premixed is charged into a pebble mill and ground for 14–16 hours.

The following are then added to the premix in the indicated order and blended with agitation (5–20 minutes) until a homogeneous mixture is obtained:

| Ingredient | Parts by Weight |
| --- | --- |
| Hydroxyethylcellulose | 45 |
| Acrylic emulsion (AC-61) | 230 |
| Urethane emulsion (X-1033) | 41 |
| Defoamer (Colloid 677) | 1 |
| Surfactant (Triton XQS-20, Rohm & Haas) | 1.5 |

Aside from the added fire retardant property, this coating composition has the same desirable properties as the other coating compositions described herein as does the coating to which it dries. Numerous techniques for varying the formulations of the present invention to best suit them for various applications are discussed above. These are equally applicable to the intumescent coatings.

One of the more important modifications is perhaps the deletion of the pigments and other opaque ingredients to produce a clear, intumescent coating composition. Furthermore, intumescent coatings in accord with the present invention can be admixed with other of the coatings disclosed herein. This imparts fire retardancy to such compositions.

As indicated above, compositions in accord with the present invention have good adhesive properties and are useful as binders as well as coatings. The following example is concerned with a formulation in which the composition serves both as a binder and as a coating:

EXAMPLE VIII

Stucco Coating

A Hockmeyer or Morehouse-Cowles mill at low speed is charged with a pigmented acrylic/urethane composition such as that described in Example II and water in a ratio of 55 percent acrylic/urethane composition and 45 percent water. To this are added, in order, 16–50 pounds of cellulosic pulp such as masticated waste paper and 50–200 pounds of calcium metasilicate extender per 100 gallons of the first two ingredients. Mixing is continued for on the order of 10 minutes.

The resulting composition can be applied to the substrate by any of a variety of conventional techniques—for example, with a hand-type gun or with a motor driven, gunite type applicator. The composition dries rapidly at room temperature to a textured coating which resembles conventional stucco but, unlike the latter, is highly resilient and otherwise has properties comparable to the other coatings of the present invention.

As in the case of those other coating compositions, the textured types can be modified considerably to best suit them for particular applications. Numerous modifications are suggested above, and others will be readily apparent to those skilled in the relevant arts. One especially important modification is the use of fire resistant pigments and/or additives to impart fire retardant properties to the coating. Another is the substitution of other fillers to alter the texture of the final coating.

Another important and representative application in which the compositions of the present invention are employed as binders is in the manufacture of block-type structural substitutes for bricks, cinderblocks, and the like. The following example deals with the manufacture of such components:

EXAMPLE IX

A composition as described in Example VIII but without the pigment and pigment extenders was made and cast into molds having the dimensions of a conventional brick and a conventional cement or cinderblock. The castings were allowed to dry in air for approximately 24 hours and removed from the molds; room temperature drying in air was then continued until the acrylic/urethane constituents were fully cured.

The resulting castings were approximately one-half as heavy as the corresponding conventional structural components, had a high degree of resiliency, and possessed excellent strength and structural integrity.

These castings were immersed in water for a period of 72 hours without loss of strength or structural integrity. The gain in weight (due to absorption of water) was less than that of cinderblocks similarly immersed, indicating that the castings would be suitable for exterior applications.

A number of the constituents employed in the exemplary compositions described above are identified only in the first example in which they appear in the interest of avoiding needless repetition. In such cases, the constituent in the succeeding example can be the same as in the example in which it is first identified or one of the alternatives specified in such example.

As indicated previously, the foregoing examples are intended only to describe the making of representative formulations, not all of the compositions within the scope of the present inventions. Other types of formulations I contemplate include, but are by no means limited to, primers for metallic and other surfaces, self-priming exterior coatings, and wood finishes and stains.

Also, as again indicated previously, the proportion of urethane polymer to acrylic polymer can be increased above 90 percent in applications where the advantages of room temperature drying are secondary to maximum durability and other physical properties. The resultant compositions are particularly useful to provide coatings on high speed aircraft and other vehicles. These formulations can be cured by heat or by a combination of heat and internal or external catalysis.

To the extent that they are not expressly excluded therefrom, the foregoing and other formulations in accord with the principles of the present invention are fully intended to be covered in the appended claims.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A composition dryable to a textured coating which consists essentially of a pigmented mechanical, aqueous dispersion of two separate polymeric solids, one being a nonionic urethane polymer prepared by reacting together an organic diamine and an isocyanate-terminated polyurethane prepolymer formed from a polyalkylene ether polyol and an organic polyisocyanate and the other being an addition acrylic polymer of a monomer having the formula:

where R is hydrogen or methyl and A is an alkylene group having two or three carbon atoms with the urethane polymer being present in an amount ranging from about 3 percent to about 90 percent of the acrylic polymer, the solids content of the dispersion being at least 35 percent; and from about 16–50 pounds of filler additives per 100 gallons of the aqueous acrylic/urethane dispersion.

2. The composition of claim 1, wherein the solids in the acrylic/urethane dispersion constitute at least about 55 percent of the dispersion.

3. The composition as defined in claim 1, wherein the urethane polymer is a polymer or a mixture of polymers in which the organic diamine is 2-methylpiperazine, the polyalkylene ether polyol is polyoxypropylene polyol and the organic polyisocyanate is toluene diisocyanate, and has the following properties:

| Solids (% by weight) | 50 ± 2 |
| Specific Gravity | [ca.] 1.05 |
| Viscosity (cps at 77° F.) | [ca.] 150–200 |
| Surface tension (dynes per cm) | [c.a.] 50–55 |
| pH | 6.5–8.5. |

4. The composition as defined in claim 1, wherein the acrylic is an emulsion having the following properties:

| Solids content | 46–47% |
| pH | 9.5–10.0 |
| Specific Gravity | 1.13. |

5. A composition as defined in claim 1, wherein said filler additives include from about 16–50 pounds of cellulosic pulp.

6. The composition as defined in claim 5, wherein the urethane polymer is a polymer or a mixture of polymers in which the organic diamine is 2-methylpiperazine, the polyalkylene ether polyol is polyoxypropylene polyol and the organic polyisocyanate is toluene diisocyanate, and has the following properties:

| Solids (% by weight) | 50 ± 2 |
| Specific Gravity | [ca.] 1.05 |
| Viscosity (cps at 77° F.) | [ca.] 150–200 |
| Surface tension (dynes per cm) | [ca.] 50–55 |
| pH | 6.5–8.5. |

7. The composition as defined in claim 5, wherein the acrylic is an emulsion having the following properties:

| Solids content | 46–47% |
| pH | 9.5–10.0 |
| Specific Gravity | 1.13 |

8. The method of making a structural component, comprising the steps of forming an aqueous dispersion of an acrylic polymer and a urethane polymer wherein the aqueous dispersion consists essentially of a mechanical, aqueous dispersion of two separate polymeric solids, one being a nonionic urethane polymer prepared by reacting together an organic diamine and an isocyanate-terminated polyurethane prepolymer formed from a polyalkylene ether polyol and an organic polyisocyanate and the other being an addition acrylic polymer of a monomer having the formula:

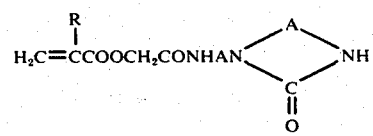

where R is hydrogen or methyl and A is an alkylene group having two or three carbon atoms, the urethane polymer being present in an amount ranging from about 3 to about 90 percent by weight of the addition polymer and the solids content of the dispersion being at least 35 percent; combining said aqueous dispersion with an additive filler, there being about 16–250 pounds of additive filler per 100 gallons of the aqueous acrylic/urethane dispersion; casting the composition thus formed; and drying the cast material.

9. The method as defined in claim 8, wherein the additive filler is at least in part a cellulosic material.

10. The method as defined in claim 9, wherein the additive filler is at least in part a silicate compound.

11. The method as defined in claim 8, wherein the additive filler is at least in part a silicate compound.

12. A structural component, which is the dried residue of a castable composition consisting essentially of an aqueous dispersion of an acrylic polymer and a urethane polymer in which the urethane polymer is present in an amount ranging from about 3 percent to about 90 percent of the acrylic polymer and a filler additive, there being about 16–250 pounds of filler additive per 100 gallons of the aqueous acrylic/urethane dispersion; and the aqueous dispersion consists essentially of a mechanical, aqueous dispersion of two separate polymeric solids, one being a nonionic urethane polymer prepared by reacting together an organic diamine and an isocyanate-terminated polyurethane prepolymer formed from a polyalkylene ether polyol and an organic polyisocyanate and the other being an addition acrylic polymer of a monomer having the formula:

where R is hydrogen or methyl and A is an alkylene group having two or three carbon atoms and the solids content of the aqueous dispersion being at least 35 percent.

13. A structural component as claimed in claim 12 wherein at least part of said filler additive is cellulosic pulp and at least part of said filler additive is a silicate compound, there being about 16–50 pounds of pulp per 100 gallons of the aqueous acrylic/urethane dispersion prior to the component being rendered as a dried structural component and there being about 50–200 pounds of a silicate compound per 100 gallons of the aqueous acrylic/urethane dispersion prior to the component being rendered as a dried structural component.

14. A structural component as defined in claim 12, wherein the urethane polymer is a polymer or a mixture of polymers in which the organic diamine is 2-methylpiperazine, the polyalkylene ether polyol is polyoxypropylene polyol and the organic polyisocyanate is toluene diisocyanate, and has the following properties.

| | |
|---|---|
| Solids (% by weight) | 50 ± 2 |
| Specific Gravity | [ca.] 1.05 |
| Viscosity (cps at 77° F.) | [ca.] 150–200 |
| Surface tension (dynes per cm) | [ca.] 50–55 |
| pH | 6.5–8.5. |

15. A structural component as defined in claim 12, wherein the acrylic is an emulsion having the following properties:

| | |
|---|---|
| Solids content | 46–47% |
| pH | 9.5–10.0 |
| Specific Gravity | ca. 1.13 |

16. A structural component as defined in claim 12, wherein at least part of said filler additive is cellulosic pulp.

17. A structural component as defined in claim 12, wherein at least part of said filler additive is a silicate compound.

* * * * *